United States Patent [19]

Kerper

[11] Patent Number: 5,181,687
[45] Date of Patent: Jan. 26, 1993

[54] VEHICLE REAR VIEW MIRROR MOUNTING BRACKET

[75] Inventor: Richard W. Kerper, Beverly Hills, Mich.

[73] Assignee: Delbar Products, Inc., Bloomfield Hills, Mich.

[21] Appl. No.: 770,999

[22] Filed: Oct. 1, 1991

[51] Int. Cl.$^5$ .............................................. B60R 1/02
[52] U.S. Cl. .................................................. 248/479
[58] Field of Search ............... 248/475.1, 476, 479, 248/466; 359/871, 872

[56] References Cited

U.S. PATENT DOCUMENTS

| | | | |
|---|---|---|---|
| 3,068,969 | 12/1962 | Van Kerschaver | 248/475.1 X |
| 3,976,275 | 8/1976 | Clark | 248/487 |
| 4,030,692 | 6/1977 | Szilagyi | 248/487 |
| 4,422,724 | 12/1983 | Otsuka et al. | 248/475.1 X |
| 4,776,231 | 10/9198 | Cummins et al. | 248/476 X |
| 5,060,905 | 10/1991 | Sharp | 248/479 |

Primary Examiner—Ramon O. Ramirez
Attorney, Agent, or Firm—Brooks & Kushman

[57] ABSTRACT

A mounting structure for an exterior rear view mirror assembly of a vehicle is disclosed including a mounting bracket having a platform portion, screws for securing the platform portion to an outer door panel of the vehicle, and an arm portion connected to the platform portion, the platform portion supporting the mirror assembly and the arm portion extending through the outer door panel whereby the mirror assembly is secured to an inner door panel at a point of securement below the mirror assembly thus providing a two-point mounting that is characterized by improved rigidity and durability.

11 Claims, 4 Drawing Sheets

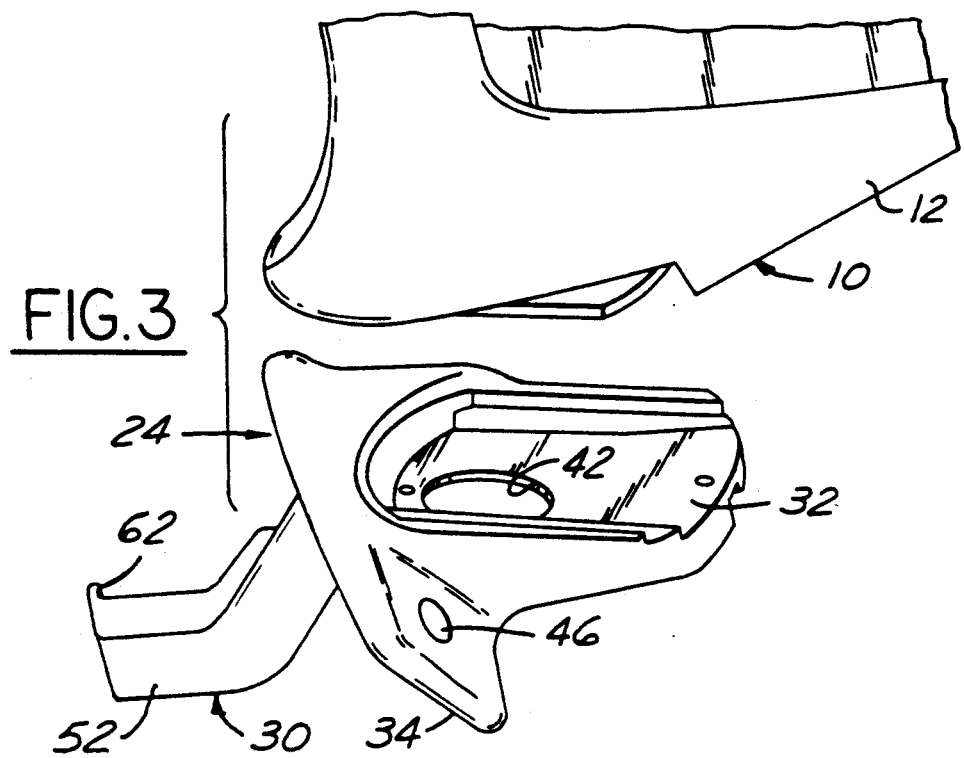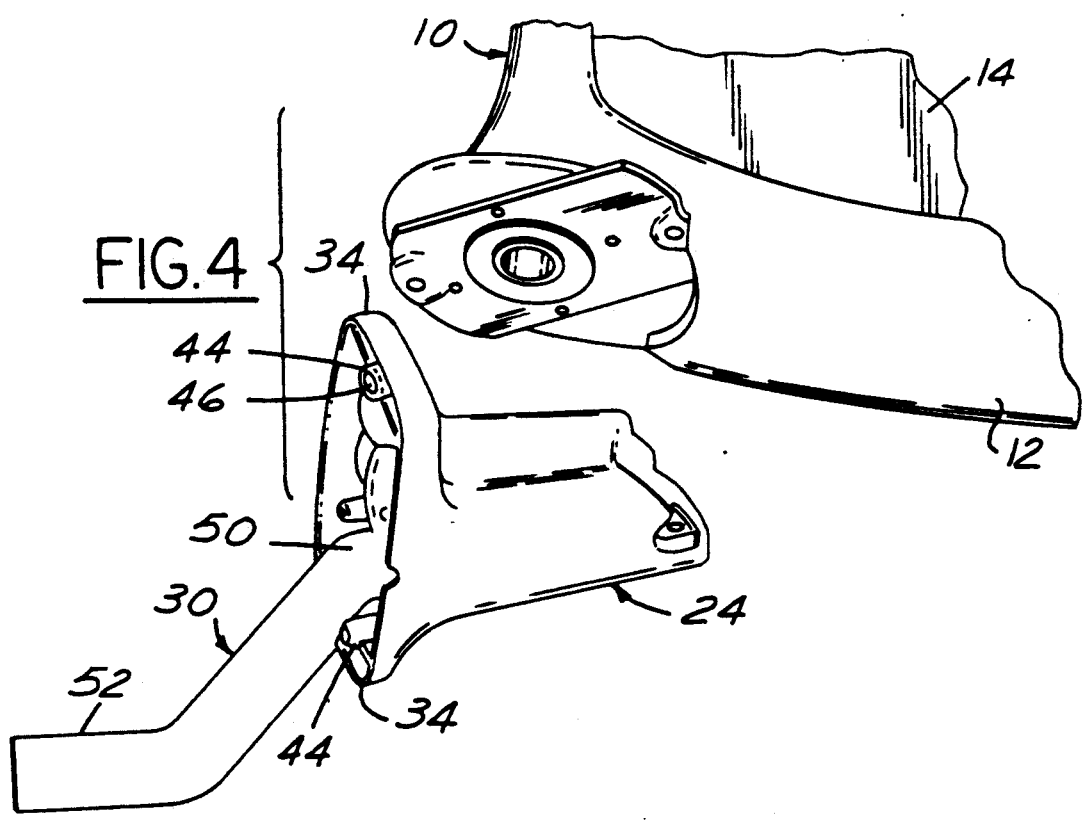

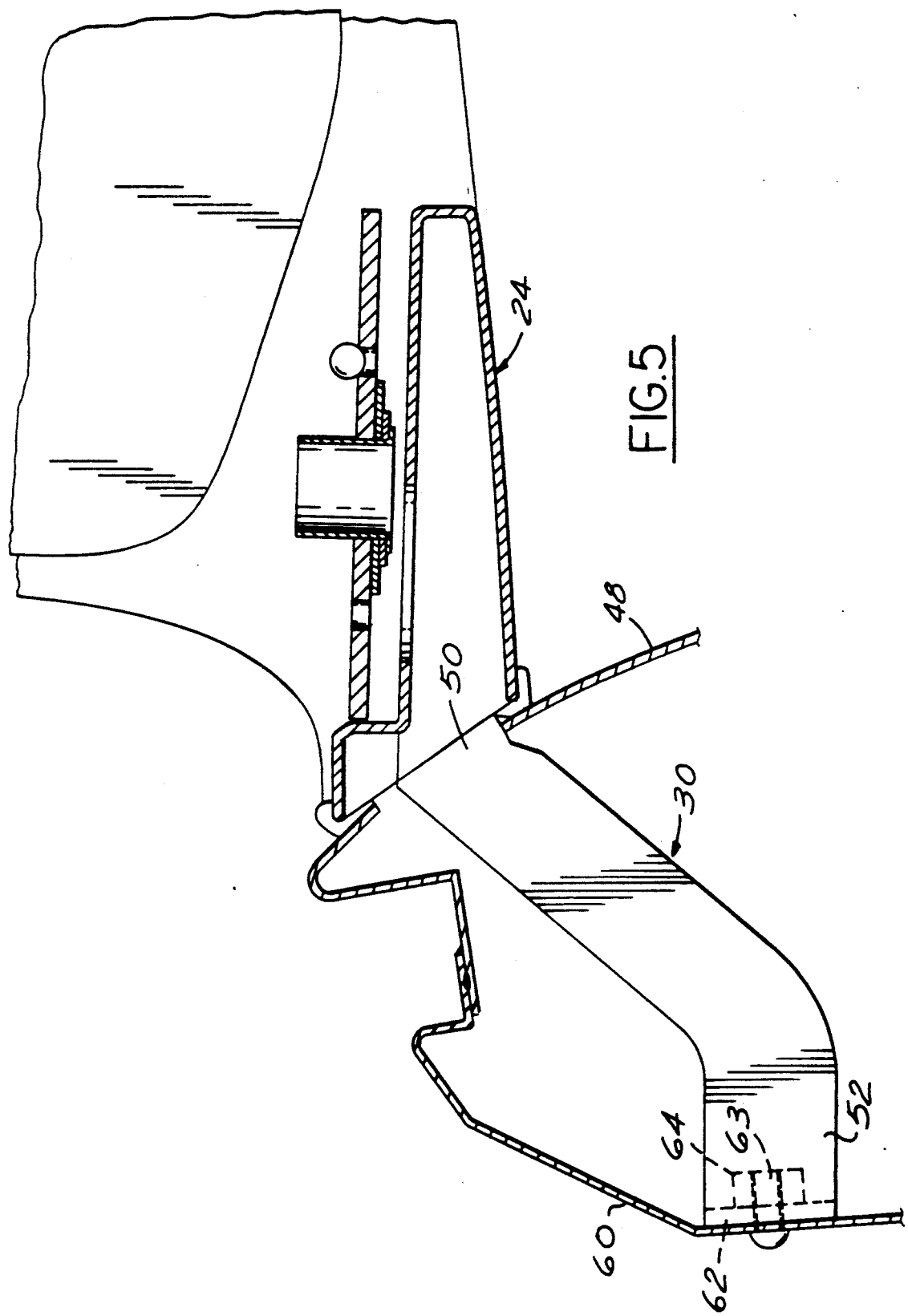

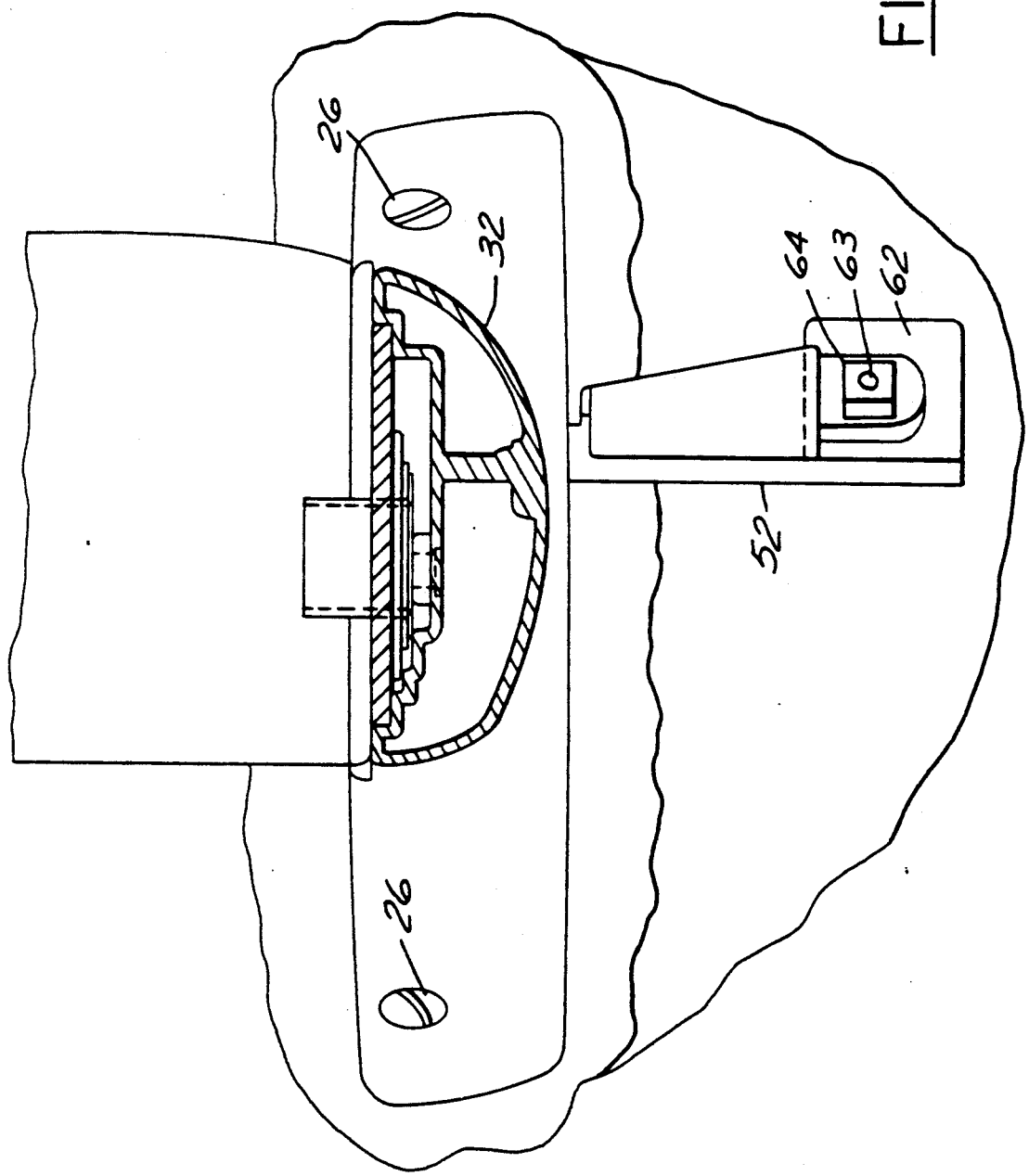

VEHICLE REAR VIEW MIRROR MOUNTING BRACKET

TECHNICAL FIELD

This invention relates to vehicle rear view mirrors, and more particularly to a means for mounting a rear view mirror including a mounting bracket for an exterior rear view mirror supported by the inner and outer door panels of an entry door of the vehicle.

Background Art

Conventionally, support brackets for exterior rear view mirrors of vehicles incorporate a cantilever design. For instance, U.S. Pat. No. 4,165,156 to O'Connell discloses a vehicle mirror which includes a bracket fastened to the exterior surface of the vehicle door. In an alternative arrangement, the mirror support bracket is fastened to the interior surface of the outer door panel. U.S. Pat. Nos. 3,976,275 and 4,030,692 show examples of this design.

A cantilever design such as those disclosed by the above references is generally necessary to permit the window to be retracted into the recess between the inner and outer door panels of the door. Such cantilever designs are subject to vibrations when mounted in a single vertical plane, or are aesthetically unappealing when strengthened by a member depending along the exterior of the door. Also these designs may tend to fail after extended use because of road vibrations. Failure is accelerated if any body panel rust occurs in the vicinity of the mounting.

U.S. Pat. No. 3,064,536 to Weingartner teaches a rear vision mirror assembly supported between the outer panel and inner panel of a vehicle body. A tubular shaft serves as a mounting shaft, but it relies on the threaded attachment to the outer panel to provide the principal support for the mirror assembly.

U.S. Pat. No. 4,278,227 to Davis et al discloses a vehicle rear view mirror in which a tubular mounting member passes through apertures in the inner skin and outer skin of the vehicle door. A lock nut threaded on a mounting member secures the mirror in place as the member bridges the inner and outer skins.

U.S. Pat. No. 4,936,537 to Namba et al discloses a mounting structure for a mirror comprising a frame with a projection which extends through apertures in the inner and outer walls of the door panel.

DISCLOSURE OF THE INVENTION

It is an object of the present invention to provide an improved mounting structure including a mounting bracket for an exterior rear view mirror of a vehicle, the mounting bracket comprising a platform portion for supporting the exterior rear view mirror, means for securing the platform portion to an outer door panel, and an arm portion extending through the outer door panel and having a first end integrally connected to the platform portion and a second end adapted to be secured to the inner door panel.

It is another object of the present invention to provide a vehicle rear view mirror mounting bracket of the type described above which provides a more stable support for the mirror than conventional cantilevered designs and which is adapted for convenient assembly to a vehicle door during vehicle assembly operations or during assembly in an aftermarket service facility.

Still another object of the present invention is the provision of a mounting bracket of the type described above which does not interfere with the extension and retraction of the passenger windows of the vehicle.

In carrying out the above objects and other objects of the present invention, a rigid, unitary mounting bracket for an exterior rear view mirror of a vehicle is provided. The mounting bracket comprises a platform portion for supporting the exterior rear view mirror, means for securing the platform portion to an outer door panel, and an arm portion extending through the outer door panel. The arm portion includes a first end connected to the platform portion, and a second end adapted to be secured to the inner door panel at a point of securement.

The above objects and other objects, features and advantages of the present invention are readily apparent from the following detailed description of the best mode for carrying out the invention when taken in connection with the accompanying drawings.

BRIEF DESCRIPTION OF DRAWING

FIG. 3 is a perspective view of the mounting bracket and the exterior rear view mirror;

FIG. 4 is a perspective view of the mounting bracket and the underside of the exterior rear view mirror;

FIG. 5 is a cross-sectional view of the mounting bracket taken along line 5—5 of FIG. 2; and FIG. 6 is a cross-sectional view of the mounting bracket taken along line 6—6 of FIG. 2.

BEST MODE FOR CARRYING OUT INVENTION

Figure 1:
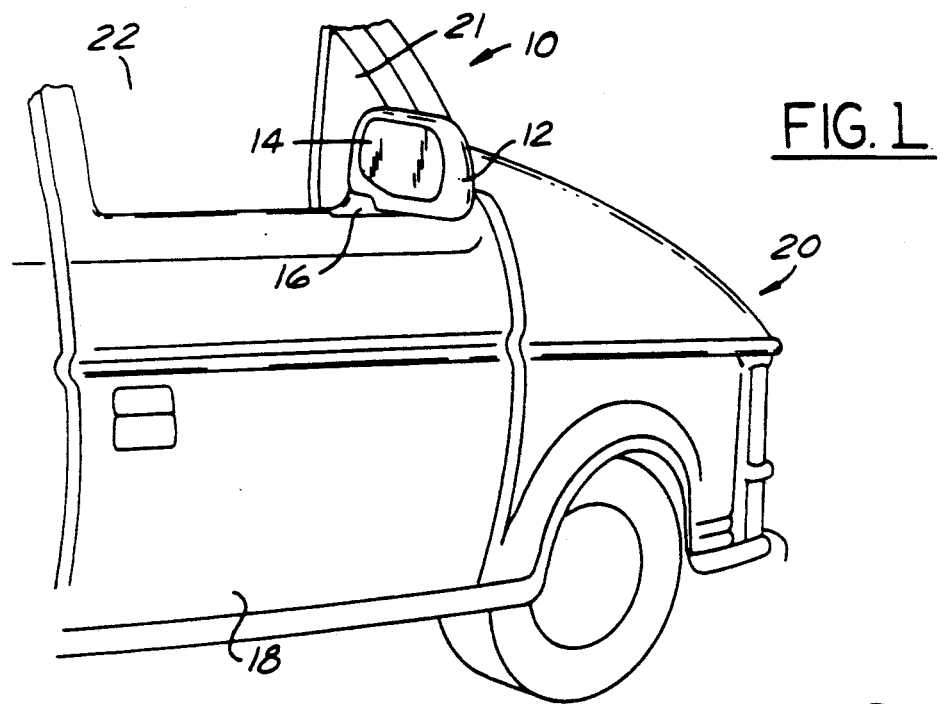
FIG. 1 is a perspective view of a vehicle exterior rear view mirror attached to an entry door of the vehicle.

With reference to the drawings, the preferred embodiment of the present invention will be described. FIG. 1 shows an exterior rear view mirror assembly 10 including a mirror housing 12, a mirror 14, and a mounting bracket 16 for mounting the mirror assembly 10 to the passenger entry door 18 of a vehicle 20. The mirror 14 is mounted within the mirror housing 12 and is rotatable about vertical and horizontal axes. The driver of the vehicle may then control the orientation of the mirror 14 from inside the vehicle by any well known means. The mounting bracket 16 may be positioned below a vent window 21, adjacent a window 22 which is conventionally supported by and assembled within the opposite spaced apart door panels that comprise the entry door 18.

Figure 2:
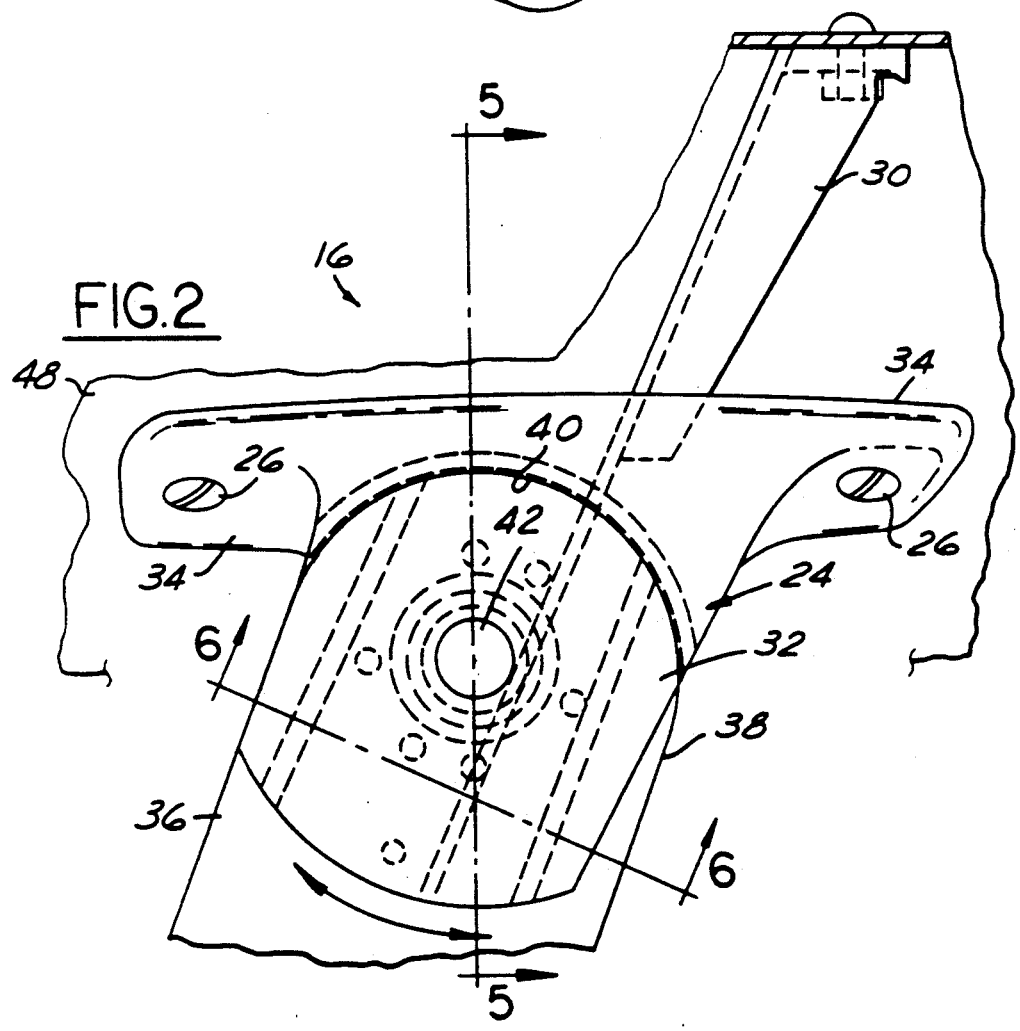
FIG. 2 is a plan view of a mounting bracket according to the present invention for the exterior rear view mirror of the vehicle.

FIG. 2 shows the mounting bracket 16 according to the present invention for a vehicle exterior rear view mirror assembly, such as the mirror assembly 10. The mounting bracket 16 comprises a platform portion 24, screws 26 for securing the platform portion 24 to the outer door panel 28, and an arm portion 30. The platform portion 24 includes a central section 32 and a pair of opposed outboard wings 34 disposed on either side of the central section 32.

The central section 32 is defined by opposite parallel sides 36 and 38, respectively, and a semicircular raised rim 40. Preferably, the platform portion 24 and the arm portion 30 are zinc or aluminum and are die cast as a single piece. The arm portion 30 is generally at an angle greater that 180 degrees to the sides 36 and 38 of the central section, so that the die may properly be drawn. The central section 32 lies in a generally horizontal plane to facilitate support of the mirror assembly 10. An offset hole 42 through the central section 32 is adapted to accept an electrical cord therethrough to allow the mirror 14 to be electrically adjusted.

As shown in FIGS. 3 and 4, each of the opposite outboard wings 34 has a generally cylindrical projection 44 on its rearward surface defining a hole 46 through each of the opposite outboard wings 34. In the preferred embodiment, the screws 26 are adapted to extend through the holes 46 in the opposite outboard wings 34 and threadingly engage an outer door panel 48 of the entry door 18. It should be appreciated that other fastening means for securing the platform portion 24 to the outer door panel 48, such as blind bolts or rivets, can be placed through the holes 46 if desired to secure the platform portion 24 to the outer door panel 48. The platform portion 24 is also adapted to support the exterior rear view mirror assembly 10 pivotably about a vertical axis.

FIGS. 5 and 6 show one embodiment of the invention in which the arm portion 30 extends through the outer door panel 48 arm portion 30 includes a first end 50 and a second end 52, the first end 50 of the arm portion 30 being connected to the platform portion 24. The arm portion 30 is bent between its first end 50 and its second end 52 so as to provide a point of securement to the inner door panel 60 below the horizontal plane defined by the central section 32 of the platform portion 24. The mounting bracket 16 is strongest when the vertical distance between the point of attachment of the outboard wings 34 and the second end 52 point of securement is a maximum. There is a practical limit to this distance, however, due to the difficulties in forming the bracket and the amount of material required.

The second end 52 of the arm portion 30 includes a flange 62. The flange 62 is designed to be generally co-planar with the inner door panel 60 at the point of securement. The arm portion 30 does not extend through the inner door panel, but rather is fastened to the inner door panel 60. Preferably, a bolt 63 extends from inside the inner door panel 60, through the inner door panel and the flange 62, and is held in place by nut 64. This provides the second point of support for the mounting bracket 30. Because the mounting bracket 30 is positioned adjacent the retractable window 22 of the vehicle, it does not interfere with the window's retraction out of nor extension into the recess between the inner and outer door panels 60 and 28.

It should be understood that while the form of the invention herein shown and described constitutes a preferred embodiment of the invention, it is not intended to illustrate all possible forms thereof. It also should be understood that the words used are words of description rather than limitation, and various changes may be made without departing from the spirit or scope of the invention disclosed.

I claim:

1. A mounting bracket for an exterior rear view mirror assembly of a vehicle, the vehicle having an entry door including opposite spaced apart outer and inner door panels, the mounting bracket comprising:
   a platform portion for supporting the exterior rear view mirror assembly;
   means for securing the platform portion to the outer door panel; and
   an arm portion extending through the outer door panel, the arm portion including a first end and a second end, the first end of the arm portion being connected to the platform portion and the second end of the arm portion being adapted to be secured to the inner door panel at a point of securement, the second end of the arm portion comprising a flange which is generally co-planar with the inner door panel at the point of securement.

2. The mounting bracket of claim 1 wherein the platform portion is adapted to support the exterior rear view mirror pivotably about a vertical axis.

3. The mounting bracket of claim 1 wherein the platform portion includes a central section and opposed outboard wings disposed on either side of the central section, each of the opposed outboard wings having a hold therethrough for accommodating a fastening device.

4. The mounting bracket of claim 3 wherein the means for securing the platform portion to the outer door panel comprise screws adapted to extend through the holes in the opposite outboard wings and threadingly engage the outer door panel.

5. The mounting bracket of claim 3 wherein the central section of the platform portion lies in a generally horizontal plane.

6. The mounting bracket of claim 5 wherein the point of securement between the second end of the arm portion and the inner door panel is located below the horizontal plane defined by the central section of the platform portion.

7. The mounting bracket of claim 1 wherein the arm portion is bent between its first and second ends.

8. An exterior rear view mirror assembly for a vehicle passenger door, the passenger entry door including opposite spaced apart outer and inner door panels, the rear view mirror assembly comprising:
   a mirror housing;
   a mirror within the mirror housing;
   a platform portion connected to the mirror housing and providing support therefor;
   means for securing the platform portion to the vehicle outer door panel; and
   an arm portion extending through the vehicle outer door panel, the arm portion including a first end and a second end, the first end of the arm portion being connected to the platform portion and the second end of the arm portion being adapted to be secured to the vehicle inner door panel at a point of securement, the second end of the arm portion comprising a flange which is generally co-planar with the inner door panel at the point of securement.

9. A mounting bracket for an exterior rear view mirror of a vehicle, the vehicle having an entry door including opposed spaced apart outer and inner door panels, the mounting bracket comprising:
   a platform portion for supporting the exterior rear view mirror, the platform portion including opposite outboard wings each having a hole therethrough, the holes being adapted to accept fasteners therethrough for securing the platform portion to the outer door panel; and
   an arm portion extending through the outer door panel, the arm portion including a first end and a second generally planar flanged end, the first end of the arm portion being connected to the platform portion and the second generally planar flanged end of the arm portion being adapted to be secured to the inner door panel at a point of securement which is substantially co-planar with the second end.

10. A mounting bracket for an exterior rear view mirror assembly of a vehicle, the vehicle having an entry door including opposite spaced apart outer and inner door panels, the mounting bracket comprising:
   a platform portion for supporting the exterior rear view mirror assembly;
   means for securing the platform portion to the outer door panel; and
   an arm portion extending through the outer door panel, the arm portion including a first end and a second end, the first end of the arm portion being connected to the platform portion and the second end of the arm portion being adapted to be secured to the inner door panel at a point of securement, the platform portion further including a central section and opposed outboard wings disposed on either side of the central section, each of the opposed outboard wings having a hole therethrough for accommodating a fastening device.

11. The mounting bracket of claim 10 wherein the second end of the arm portion comprises a flange which is generally co-planar with the inner door panel at the point of securement.

* * * * *